United States Patent Office — 3,202,660 — Patented Aug. 24, 1965

3,202,660
PROCESS FOR THE PREPARATION OF 3-ARYL-AMINO-1,3-DIAZACYCLOALKENES
Karl Zeile, Karl-Heinz Hauptmann, and Helmut Stähle, Ingelheim, Germany, assignors, by mesne assignments, to Boehringer Ingelheim G.m.b.H., Ingelheim (Rhine), Germany, a corporation of Germany
No Drawing. Filed Oct. 1, 1962, Ser. No. 227,527
Claims priority, application Germany, Oct. 9, 1961, B 64,319
2 Claims. (Cl. 260—254)

This invention relates to 2-arylamino-1,3-diazacycloalkenes and to a novel method of preparing such compounds.

Various methods have been suggested and devised for the preparation of substituted 2-amino-1,3-diazacycloalkenes. One of these methods comprises starting from suitable substituted 1,3-diazacycloalkenes and adding the basic amino radical to the carbon atom in the 2-position of the heterocyclic molecule. Still another method comprises subjecting an alkylene diamine to a condensation reaction with a suitable carbamic acid derivative. Finally, United States Patent 2,899,426 discloses that 1,3-diazacycloalkenes are obtained when isothiouronium salts are heated with ethylenediamine or propylenediamine to temperatures of 20 to 140° C., preferably 60 to 80° C., in polar solvents containing hydroxyl groups, such as water or lower alkanols. The mild reaction conditions make allowance for the instability of the starting materials. The general disclosure of said United States patent states that the reaction period is from 15 minutes to 24 hours; however, in none of the working examples is the reaction period less than eight hours.

Upon repeating the working examples of U.S. Patent 2,899,426, we have found that these extremely long reaction periods are necessary to achieve reasonably good yields. The amount of mercaptan given off was used as a measure of the degree of progress of the reaction. For instance, when Example II of the patent was repeated, it was found that after 16 hours of reaction only 90% of the original reactants had entered into the reaction, and upon working up the reaction mixture at this point the yield of imidazoline hydroiodide was only 60% of theory. It is self-evident, therefore, that the method disclosed in said U.S. patent is only of academic interest and inherently unsuitable for production of 1,3-diazacycloalkenes on an industrial scale.

It is an object of the present invention to provide a method for the preparation of 2-arylamino-1,3-diazacycloalkenes which produces high yields of the desired end products after only a fraction of the reaction periods required in the prior art processes.

Another object of the present invention is to provide a process for the preparation of novel substituted 2-arylamino-1,3-diazacycloalkenes which can not be produced by any of the processes heretofore known in the art for the production of substituted 1,3-diazacycloalkenes.

Still another object of the present invention is to provide novel substituted 2-arylamino-1,3-diazacycloalkenes having useful properties.

Other objects and advantages of the invention will become apparent as the description thereof proceeds.

We have discovered broadly that, contrary to reasonable expectations, substituted 2-arylamino-1,3-diazacycloalkenes are obtained with very high yields and after only a few minutes of reaction time by reacting a correspondingly substituted isothiouronium salt with a lower alkylenediamine at a temperature between 100 and 200° C., preferably 140 to 180° C., in the absence of a solvent; that is, in contradistinction to prior methods the isothiouronium salt and the alkylenediamine are the sole components of the reaction mixture. If the reaction is carried out under these conditions, it reaches virtually quantitative completion within a few minutes. For instance, when N-1-naphthyl-S-methylisothiouronium hydroiodide was reacted under the above-described conditions with ethylenediamine, 90% of the theoretical amount of mercaptan had split off within 15 minutes, and after working up the reaction mixture in the customary manner 65% of the theoretical amount of 2-(1'-naphthylamino)-1,3-diazacyclopentene-2 was recovered.

More specifically, therefore, the present invention relates to a process for the preparation of substituted 2-arylamino-1,3-diazacycloalkenes of the formula

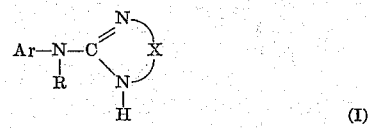

wherein Ar is a carbocyclic aromatic substituent, preferably phenyl or naphthyl, which may have one or more nuclear substituents attached thereto, preferably methyl, ethyl or chlorine in the 2-, 4- or 6-positions,
R is hydrogen or lower alkyl, and
X is alkylene of 2 to 3 carbon atoms, and their non-toxic, pharmacologically acceptable acid addition salts, which comprises heating a mixture consisting solely of an isothiouronium salt of the formula

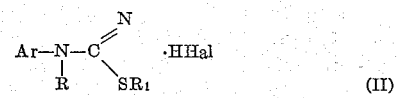

wherein Ar and R have the meanings previously defined in connection with Formula I, $R_1$ is lower alkyl and Hal is chlorine, bromine or iodine, and an alkylenediamine of the formula $$H_2N-X-NH_2 \quad \text{(III)}$$

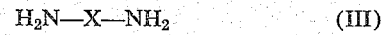

wherein X has the meanings previously defined in conjunction with Formula I, to a temperature of 100 to 200° C., preferably 140 to 180° C., for a period of about 10 to 120 minutes, making the reaction mixture alkaline and thereafter, if desired, transforming the free 2-arylamino-1,3-diazacycloalkene base thus obtained into its acid addition salts by conventional methods.

More particularly, the reaction according to the present invention is preferably carried out by heating the isothiouronium salt (II) with a molar equivalent or a slight excess of the alkylenediamine (III) for 10 to 120 minutes under reflux to a temperature of 100 to 200° C., preferably 140 to 180° C., while stirring the solvent-free reaction mixture. The reaction period and the particular reaction temperature depend largely upon the particular isothiouronium salt employed. After the evolution of gaseous mercaptan has ceased, the cooled reaction mixture is worked up and the product purified in customary manner.

As indicated, the process according to the present invention is generally operative for the preparation of 2-arylamino-1,3-diazacycloalkenes of the Formula I above, which includes compounds described in the prior art. However, Formula I also includes novel compounds which have never before been described. These novel compounds, which are represented by the formula

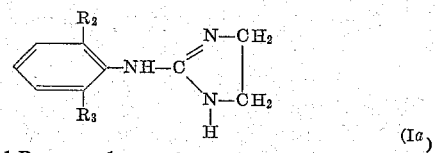

wherein $R_2$ and $R_3$ are selected from the group consisting of methyl, ethyl and chlorine, and their non-toxic, pharmacologically acceptable acid addition salts, are not obtainable by any of the previously known methods for the preparation of 2-amino-1,3-diazacycloalkenes. For instance, when 2,6-diethylphenyl-S-methylisothiouronium hydroiodide was refluxed for 15 hours with ethylenediamine in the presence of amyl alcohol, pursuant to the teachings of U.S. Patent 2,899,426, no yield of the corresponding imidazoline base could be isolated from the reaction mixture. However, when a mixture of the same reactants was heated at about 170° C. for two hours without any solvent at all, the reaction mixture yielded 50% of the theoretical amount of 2-(2',6'-diethylphenyl)-amino-1,3-diazacyclopentene-(2).

The following examples shall further illustrate the present invention and enable others skilled in the art to understand it more completely. It should be understood, however, that the invention is not limited to the particular examples given below.

EXAMPLE I

*Preparation of 2-(naphthylamino)-1,3-diazacyclopentene-(2)*

N-naphthyl-S-methylisothiouronium hydroiodide of the formula

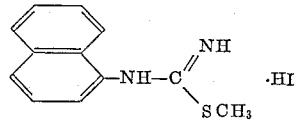

was synthesized from 18 gm. of α-naphthyl-thiourea (Houben-Weyl, 9, 887) and 10 cc. of methyliodide in absolute methanol. 23.2 gm. of the isothiouronium salt were combined with slightly more than a molar equivalent of ethylenediamine, and the resulting mixture was heated at 130–150° C. for about 1 hour, accompanied by stirring. Methyl mercaptan was given off. The reaction mixture was allowed to cool and then ether was added thereto, whereby a crystalline substance separated out. The crystalline product was separated and was repeatedly recrystallized from a mixture of methanol and ether in the presence of animal charcoal. The purified crystalline product was identified to be 2-(naphthylamino)-1,3-diazacyclopentene-(2) hydroiodide of the formula

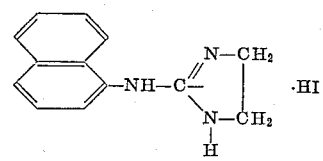

the yield was 65% of theory.

The product thus obtained was dissolved in water, and the resulting aqueous solution was made slightly alkaline with dilute aqueous sodium hydroxide, whereby the free base 2-(naphthylamino)-1,3-diazacyclopentene-(2) was liberated; it had a melting point of 150° C.

The free base was then dissolved in absolute methanol, and the resulting solution was then adjusted to an acid pH value with an ethereal hydrochloric acid solution. The acidified solution was purified with charcoal and then dry ether was added thereto until crystallization took place. The crystalline product, 2-(naphthylamino)-1,3-diazacyclopentene-(2) hydrochloride, had a melting point of 222–223° C.

EXAMPLE II

*Preparation of 2-(2',6'-diethylanilino)-1,3-diazacycylopentene-(2)*

37.5 gm. of N-(2,6-diethylphenyl)-thiourea (M.P. 162–164° C.), prepared in known fashion from 2,6-diethylaniline and ammonium thiocyanate, were refluxed for several hours together with 29.4 gm. of ethyl bromide in 50 cc. of methanol. Thereafter, the methanol solvent was evaporated in vacuo, leaving as a residue N-(2',6'-diethylphenyl)-S-ethylisothiouronium hydrobromide of the formula

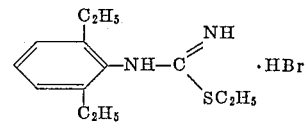

This isothiouronium salt was admixed with a small molar excess (120%) of ethylenediamine, and the resulting mixture was heated for 1 to 2 hours at 150–170° C., accompanied by stirring. Ethyl mercaptan was given off. Thereafter, the reaction mixture was allowed to cool and was then dissolved in water, whereby an oily substance separated out, which was filtered off. The filtrate was purified with charcoal and made alkaline with 2 N sodium hydroxide. A precipitate was formed which was separated by vacuum filtration and thoroughly washed with ice water. The product thus obtained was identified to be 2-(2',6'-diethylanilino)-1,3-diazacyclopentene-(2) of the formula

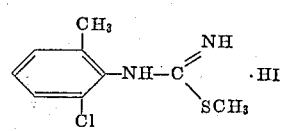

having a melting point of 155–157° C. The yield was 50% of theory.

Its hydrochloride, prepared in a manner analogous to that described in Example I, had a melting point of 209° C.

EXAMPLE III

*Preparation of 2-(2'-chloro-6'-methylanilino)-1,3-diazacyclohexene-(2)*

42.5 gm. of 3-chloro-2-amino-toluene (0.3 mol) were heated for about 5 hours at 95° C. together with 45.6 gm. of ammonium thiocyanate (0.6 mol) in 210 cc. of water and 45 cc. of an asueous 35% hydrochloric acid solution; the reaction mixture was allowed to cool and the product, N-(2-chloro-6-methylphenyl)-thiourea (M.P. 170–173° C.), was isolated in customary fashion. The substituted thiourea compound thus obtained was admixed with 36 gm. of methyl iodide and 50 cc. of methanol, and the mixture was refluxed for 1½ hours. Thereafter, the methanol was evaporated in vacuo, leaving as a residue 83 gm. of N-(2-chloro-6-methyl-phenyl)-S-methylisothiouronium hydroiodide (M.P. 163–165° C.) of the formula The isothiouronium salt was admixed with slightly more than the molar equivalent of propylenediamine-1,3 and the mixture was heated for about 2 hours at 120–150° C., accompanied by stirring. Methyl mercaptan was given off. Thereafter, the reaction mixture was allowed to cool, and then acetone was added thereto until crystallization began. The crystalline precipitate was separated by vacuum filtration. It was identified to be 2-(2'-chloro-6'-methylanilino)-1,3-diazacyclohexene-(2) hydroiodide. The filter cake was dissolved in hot water, the resulting solution was purified with charcoal and was then made alkaline with 5 N sodium hydroxide. An initially oily substance separated out which, however, crystallized after 1 to 2 hours of standing. The crystallized substance was separated by vacuum filtration and washed with a small amount of ice water. It was identified to be 2-(2'-chloro- 6′-methyl-anilino)-1,3-diazacyclohexene-(2) of the formula

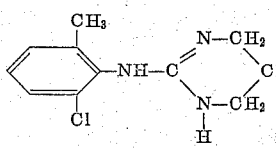

having a melting point of 133–135° C. The yield was 10.2 gm.

The hydrochloride, prepared in customary fashion from the free base, had a melting point of 234–238° C. after being recrystallized twice from a mixture of methanol and ether in the presence of animal charcoal.

EXAMPLE IV

*Preparation of 2-(2′,6′-diethylanilino)-4-methyl-1,3-diazacyclopentene-(2)*

N-(2,6-diethylphenyl)-S-ethylisothiouronium hydrobromide was synthesized as described in Example II from 2,6-diethylaniline, ammonium thiocyanate and ethyl bromide. 0.2 mol of this isothiouronium salt was heated for 1 to 2 hours at 130–160° C. together with slightly more than the molar equivalent (about 1.2 x 0.2 mol) of propylenediamine-(1,2). Thereafter, the reaction mixture, comprising the reaction product 2-(2′,6′-diethylanilino)-4-methyl-1,3-diazacyclopentene-(2) hydrobromide, was allowed to cool and was then admixed with water. The aqueous solution was filtered and made alkaline with 5 N sodium hydroxide, whereby an oily substance separated out. The oily substance was separated, dissolved in hydrochloric acid and re-precipitated with sodium hydroxide in the presence of animal charcoal. It was identified to be 2-(2′,6′-diethylanilino)-4-methyl-1,3-diazacyclopentene-(2) of the formula

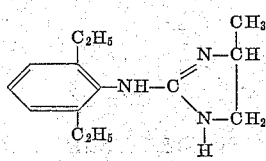

Its hydrochloride, prepared in customary fashion from the free base, was highly hygroscopic.

EXAMPLE V

*Preparation of 2-(2′-methyl-N-ethylanilino)-1,3-diazacyclopentene-(2)*

71 gm. of N-ethyl-o-toluidine were heated for about 8 hours at 95° C. together with 80 gm. of ammonium thiocyanate, 370 cc. of water and 80 cc. of an aqueous 32% hydrochloric acid solution. The substituted thiourea compound of the formula

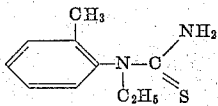

was obtained. This thiourea compound was refluxed for 2 hours together with 68 gm. of methyl iodide in 50 cc. of absolute methanol. Thereafter, the methanol was evaporated from the reaction mixture in vacuo, leaving as a residue the oily isothiouronium compound of the formula

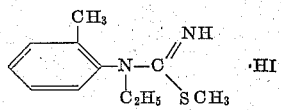

This isothiouronium hydroiodide was heated for about one hour at 120–150° C. together with slightly more than the molar equivalent of ethylenediamine. Methyl mercaptan was given off. Thereafter, the reaction mixture comprising 2-(2′-methyl-N-ethyl-anilino)-1,3-diazacyclopentene-(2) hydroiodide was allowed to cool, was then taken up in water, and the resulting solution was made alkaline with 5 N sodium hydroxide. An oily substance separated out which was isolated, dissolved in hydrochloric acid and reprecipitated from solution with sodium hydroxide in the presence of charcoal. It was identified to be 2-(2′-methyl-N-ethylanilino)-1,3-diazacyclopentene-(2) of the formula

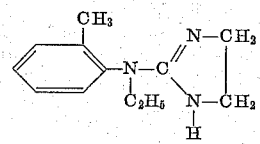

Its hydrochloride was hygroscopic.

EXAMPLE VI

*Preparation of 2-(2′,6′-dichloroanilino)-1,3-diazacyclopentene-(2)*

N-(2,6-dichlorophenyl)-thiourea (M.P. 149° C.) was prepared in customary manner from 2,6-dichloroaniline (Organic Synthesis III, 262–263) and ammonium thiocyanate. 16.0 gm. of this thiourea derivative were refluxed for 2½ hours together with 16 gm. of methyl iodide in 150 cc. of methanol. Thereafter, the methanol was evaporated out of the reaction mixture in vacuo, leaving as a residue 22 gm. of N-(2,6-dichlorophenyl)-S-methyl-isothiouronium hydroiodide of the formula

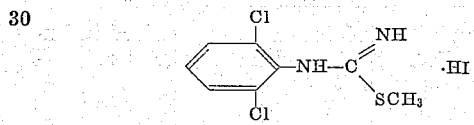

having a melting point of 170° C. The entire residue was then admixed with an excess (120%) above the molar equivalent of ethylenediamine, and the mixture was heated for about one hour at 130–150° C. Methyl mercaptan was given off. Thereafter, the reaction mixture comprising 2-(2′,6′-dichloroanilino)-1,3-diazacyclopentene-(2) hydroiodide was taken up in hot dilute acetic acid, and the resulting solution was made alkaline with 2 N NaOH. A precipitate formed, which was separated by vacuum filtration, washed with water and dried. 4.0 gm. of 2-(2′,6′-dichloroanilino)-1,3-diazacyclopentene-(2) of the formula

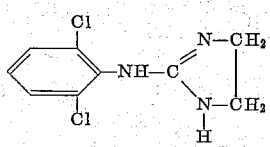

were obtained. The product had a melting point of 130° C.

The hydrochloride, prepared in customary manner, had a melting point of 305° C.

EXAMPLE VII

Using a procedure analogous to that described in Examples I and II, 2-(2′,4′,6′-trimethylanilino)-1,3-diazacyclopentene-(2) of the formula

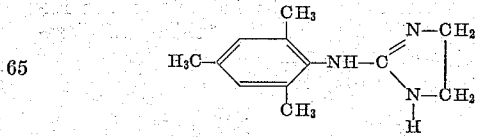

having a melting point of 156–157.5° C. was prepared from N-(2,4,6-trimethylphenyl)-S-ethylisothiouronium hydroiodide and ethylenediamine. The hydrochloride had a melting point of 117–121° C.

EXAMPLE VIII

Using a procedure analogous to that described in

Examples I and II, 2-(4'-methylanilino)-1,3-diazacyclopentene-(2) of the formula

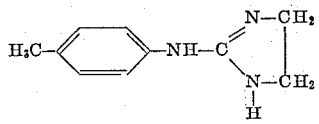

having a melting point of 125° C. was prepared from N-(p-methylphenyl) - S - methyl-isothiouronium hydroiodide and ethylenediamine. The hydrochloride had a melting point of 158–160° C.

EXAMPLE IX

Using a procedure analogous to that described in Examples I and II, 2-(2',4'-dimethylanilino)-1,3-diazacyclopentene-(2) of the formula

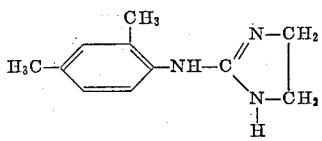

having a melting point of 106° C. was prepared from N-(2,4-dimethylphenyl) - S - ethyl-isothiouronium hydroiodide and ethylenediamine. The hydrochloride had a melting point of 146° C.

EXAMPLE X

Using a procedure analogous to that described in Examples I and II, 2-(4'-isopropyl-anilino)-1,3-diazacyclopentene-(2) of the formula

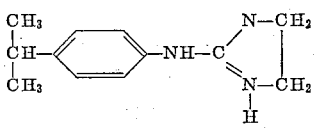

having a melting point of 135–136° C. was prepared from N-(4-isopropyl-phenyl) - S - ethyl-isothiouronium hydroiodide and ethylenediamine. The hydrochloride had a melting point of 157–159° C.

EXAMPLE XI

Using a procedure analogous to that described in Examples I and II, 2-(2',6'-dimethylanilino)-1,3-diazacyclopentene-(2) of the formula

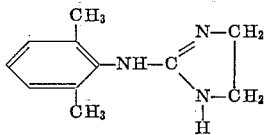

having a melting point of 143° C. was prepared from N-(2,6-dimethyl-phenyl) - S - methyl-isothiouronium hydroiodide and ethylenediamine. The hydrochloride had a melting point of 202–205° C.

EXAMPLE XII

Using a procedure analogous to that described in Examples I and II, 2-(2'-methyl-4'-ethyl-anilino)-1,3-diazacyclopentene-(2) of the formula

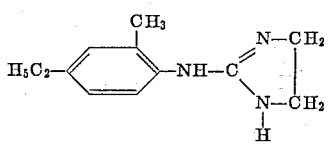

having a melting point of 105–106° C. was prepared from N-(2-methyl - 4 - ethyl-phenyl) - S - ethyl-isothiouronium hydroiodide and ethylenediamine. The hydrochloride was hygroscopic.

EXAMPLE XIII

Using a procedure analogous to that described in Examples I and II, 2-(2'-chloroanilino)-1,3-diazacyclopentene-(2) of the formula

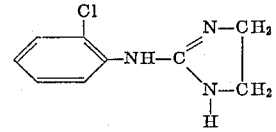

having a melting point of 131–133° C. was prepared from N-(2-chlorophenyl) - S - methyl-isothiouronium hydroiodide and ethylenediamine. The hydrochloride had a melting point of 194–196° C.

EXAMPLE XIV

Using a procedure analogous to that described in Examples I and II, 2-(2'-chloro-6'-methyl-anilino)-1,3-diazacyclopentene-(2) of the formula

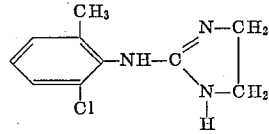

having a melting point of 143–145° C. was prepared from N-(2-chloro-6-methyl-phenyl) - S - ethyl-isothiouronium hydroiodide and ethylenediamine. The hydrochloride had a melting point of 217–220° C.

EXAMPLE XV

Using a procedure analogous to that described in Examples I and II, 2-(2',6'-dimethyl-4'-tert.butylanilino)-1,3-diazacyclopentene-(2) of the formula

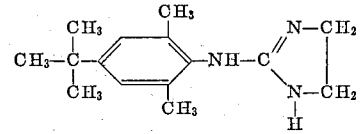

was prepared from N-(2,6-dimethyl-4-tert.butyl-phenyl)-S - methyl - isothiouronium hydroiodide and ethylenediamine. The reaction product was an oily liquid. Its hydrochloride had a melting point of 160–163° C.

EXAMPLE XVI

Using a procedure analogous to that described in Examples I and II, 2-(2'-ethyl-anilino)-1,3-diazacyclopentene-(2) of the formula

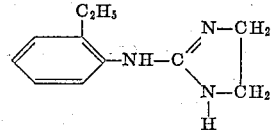

having a melting point of 94–98° C. was prepared from N-(2-ethylphenyl)-S-methyl - isothiouronium hydroiodide and ethylenediamine. The hydrochloride was hygroscopic.

EXAMPLE XVII

Using a procedure analogous to that described in Examples I and II, 2-(2',4',6'-triethylanilino)-1,3-diazacyclopentene-(2) of the formula

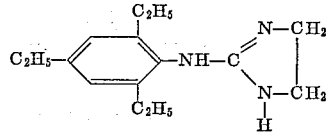

having a melting point of 133–137° C. was prepared from N - (2,4,6 - triethylphenyl) - S - ethyl - isothiouronium hydroiodide and ethylenediamine. The hydrochloride had a melting point of 240–243° C.

EXAMPLE XVIII

Using a procedure analogous to that described in Example III, 2-(2',6'-diethylanilino)-1,3-diazacyclohexene-(2) of the formula

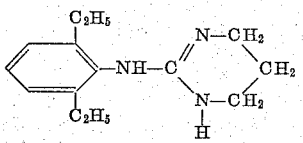

was prepared from N-(2,6-diethylphenyl)-S-methyl-isothiouronium hydroiodide and propylenediamine-1,3. The reaction product was an oily liquid. Its hydrochloride had a melting point of 94–98° C.

EXAMPLE XIX

Using a procedure analogous to that described in Example III, 2 - (2',6'-dimethyl-4'-tert.butyl-anilino)-1,3-diazacyclohexene-(2) of the formula

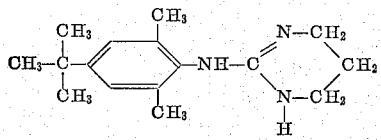

was prepared from N-(2,6-dimethyl-4-tert.butyl-phenyl)-S-methyl-isothiouronium hydroiodide and propylene-diamine-1,3. The reaction product was an oily liquid. Its hydrochloride had a melting point of 162–165° C.

EXAMPLE XX

Using a procedure analogous to that described in Example IV, 2-(2'-chloroanilino)-4-methyl-1,3-diazacyclopentene-(2) of the formula

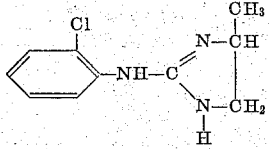

having a melting point of 105–107° C. was prepared from N - (2 - chlorophenyl) - S - ethyl - isothiouronium hydrobromide and propylenediamine-1,2. The hydrochloride was hygroscopic.

EXAMPLE XXI

Using a procedure analogous to that described in Example V, 2 - (N-ethyl-naphthylanilino) - 1,3 - diazacyclopentene-(2) of the formula

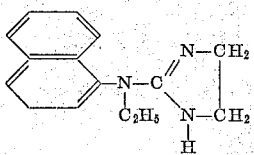

was prepared from N-naphthyl-N-ethyl-S-methyl-isothiouronium hydroiodide and ethylenediamine. The reaction product was an oily liquid. Its hydrochloride was hygroscopic.

EXAMPLE XXII

Using a procedure analogous to that described in Example V, 2-(2',6'-diethyl-N-methyl-anilino) - 1,3 - diazacyclopentene-(2) of the formula

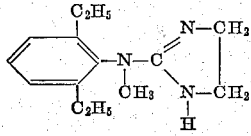

was prepared from N-(2,6-diethylphenyl) - N - methyl-S-methyl-isothiouronium hydroiodide and ethylenediamine. The reaction product was an oily liquid. Its hydrochloride was hygroscopic.

The novel compounds embraced by Formula Ia and their non-toxic acid addition salts have useful pharmacodynamic properties. More particularly, they exhibit highly effective vasoconstrictor activities.

Typical examples of pharmacologically acceptable, non-toxic acid addition salts are the hydrochlorides, hydrobromides, hydroiodides, sulfates, phosphates, nitrates, acetates, propionates, butyrates, valerates, oxalates, malonates, succinates, maleates, fumarates, lactates, tartarates, citrates, malates, benzoates, phthalates, cinnamates, salicylates, nicotinates, 2-furoates, 8-chlorotheophyllinates, and the like.

For therapeutic application, the novel 2-arylamino-1,3-diazacyclopentene-(2) substitution products according to the present invention, as well as their non-toxic acid addition salts, are advantageously applied in the form of compositions consisting essentially of an inert, physiologically compatible carrier having uniformly distributed therein from 0.1 to 0.3% by weight of the novel diazacyclopentene compounds. The inert carrier component is preferably of such consistency and nature as to adapt the finished composition for topical application to mucous membrane areas requiring vasoconstrictor therapy. Most preferred are compositions adapted for use as sprays, drops or ointments which lend themselves to topical application in the nasal cavity. In addition to the active vasoconstrictor ingredient and the inert carrier, the compositions in question may also comprise minor but effective amounts of customary antiseptics, preservatives, pH-control additives, suspension agents, and the like.

The following examples are illustrative of the type of topical vasoconstrictive compositions comprising the novel arylamino-diazacycloalkene substitution products of the present invention as active vasoconstrictor ingredients. The parts are parts by weight.

EXAMPLE XXIII

Nose drops

The nose drop solution is composed of the following ingredients:

| | Gm. |
|---|---|
| 2-(2',6'-diethylphenyl) - amino-1,3-diazacyclopentene-(2)·HCl | 0.100 |
| Secondary sodium phosphate | 3.610 |
| Citric acid | 0.250 |
| Phenylmercuric borate | 0.001 |
| Hydroxyethyl cellulose | 0.700 |
| De-mineralized water, q.s. ad 100,000 cc. | |

*Compounding procedure.*—The diazacyclopentene compound, the secondary sodium phosphate, the citric acid and the phenyl-mercuric borate (as a 0.1% aqueous solution) are dissolved in that order in half of the required amount of de-mineralized water, and the resulting solution is filtered until clear. The hydroxyethyl cellulose is stirred into the remaining amount of water. The two solutions are combined and again filtered.

EXAMPLE XXIV

Nose spray

The spray solution is compounded from the following ingredients:

| | Gm. |
|---|---|
| 2-(2',6'-diethylphenyl) - amino-1,3-diazacyclopentene-(2)·HCl | 0.200 |
| Secondary sodium phosphate | 3.610 |
| Citric acid | 0.250 |
| Phenylmercuric borate | 0.001 |
| De-mineralized water, q.s. ad 100,000 cc. | |

*Compounding procedure.*—The diazacyclopentene compound, the citric acid, the secondary sodium phosphate and the phenylmercuric borate (as a 0.1% aqueous solution) are dissolved in that order in the required amount of de-mineralized water, and the resulting solution is filtered until clear.

EXAMPLE XXV

*Ointment*

The ointment is compounded from the following ingredients:

| | Parts |
|---|---|
| 2-(2′,6′-diethylphenyl)-amino-1,3-diazacyclopentene-(2)·HCl | 0.300 |
| Yellow vaseline, q.s. ad | 100.000 |

*Compounding procedure.*—The diazacyclopentene compound is blended into the yellow vaseline.

Although only 2-(2′,6′-diethylphenyl)-amino-1,3-diazacyclopentene-(2)·HCl is the only compound of the present invention used as the active ingredient in the above illustrative composition examples, it should be understood that any of the other compounds embraced by Formula I*a* above and their non-toxic acid addition salts may be substituted in Examples XXIII to XXV with equal effect. Moreover, it should be understood that the quantities of the active ingredients in the composition examples may be varied within the percentage weight limits indicated above to meet particular requirements.

While the present invention has been illustrated with the aid of certain specific embodiments thereof, it will be readily apparent to those skilled in the art that the invention is not limited to these embodiments and that various changes and modifications may be made without departing from the spirit of the invention or the scope of the appended claims.

We claim:

1. The method of preparing 2-arylamino-1,3-diazacycloalkenes-(2) of the formula

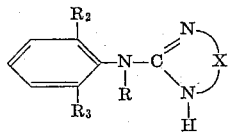

wherein
R is selected from the group consisting of hydrogen and lower alkyl,
X is selected from the group consisting of straight and branched chain alkylene of 2 to 3 carbon atoms, and
$R_2$ and $R_3$ are selected from the group consisting of methyl, ethyl and chlorine,
which comprises forming a mixture consisting solely of an aryl-substituted isothiouronium salt of the formula

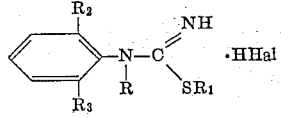

wherein
R, $R_2$ and $R_3$ have the meanings previously defined,
$R_1$ is lower alkyl, and
Hal is selected from the group consisting of chlorine, bromine and iodine,
and a lower alkylene diamine of the formula $$H_2N-X-NH_2$$

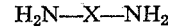

wherein X has the meanings previously defined, heating said mixture at a temperature of 100–200° C. for a period of 10 to 120 minutes, making the reaction mixture alkaline and isolating a free 2-arylamino-1,3-diazacycloalkene base of the formula

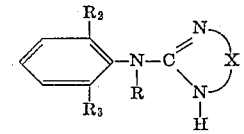

wherein R, $R_2$ and $R_3$ and X have the meanings previously defined, from the reaction mixture.

2. The method of claim 1, which comprises in addition acidifying said free base with a non-toxic acid to form the corresponding non-toxic, pharmacologically acceptable acid addition salt.

References Cited by the Examiner

UNITED STATES PATENTS

| | | | |
|---|---|---|---|
| 1,860,036 | 5/32 | Kranzlein | 260—256.4 |
| 1,912,849 | 6/33 | Kranzlein et al. | 260—309.6 |
| 2,516,108 | 7/50 | Djerassi et al. | 260—309.6 |
| 2,824,879 | 2/58 | McKay et al | 260—309.6 |
| 2,899,426 | 8/59 | Bloom | 260—239.5 |
| 2,899,434 | 8/59 | Bloom | 260—256.4 |
| 2,899,441 | 8/59 | Dornfeld | 260—309.6 |
| 2,938,038 | 5/60 | Hirt | 260—309.6 |
| 2,969,372 | 1/61 | Braun et al. | 260—310 |
| 3,048,520 | 8/62 | McKennis et al. | 167—65 |
| 3,063,902 | 11/62 | Gray et al. | 167—65 |

FOREIGN PATENTS 625,631  8/61  Canada.

OTHER REFERENCES

Najer et al.: Bul. Soc. Chim. France, 1961, pages 2114–2126.

WALTER A. MODANCE, *Primary Examiner.*

IRVING MARCUS, NICHOLAS S. RIZZO, JOHN D. RANDOLPH, *Examiners.*

UNITED STATES PATENT OFFICE
CERTIFICATE OF CORRECTION

Patent No. 3,202,660　　　　　　　　　　　　　August 24, 1965

Karl Zeile et al.

It is hereby certified that error appears in the above numbered patent requiring correction and that the said Letters Patent should read as corrected below.

Column 4, line 43, for "asueous" read -- aqueous --; column 7, lines 33 to 38, the formula should appear as shown below instead of as in the patent:

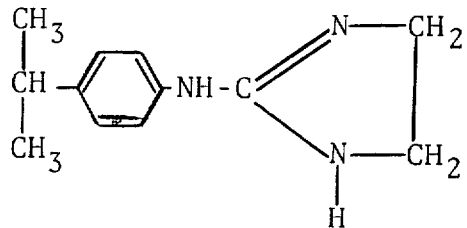

Signed and sealed this 7th day of June 1966.

(SEAL)
Attest:

ERNEST W. SWIDER　　　　　　　　　　　　　EDWARD J. BRENNER
Attesting Officer　　　　　　　　　　　　　Commissioner of Patents